Aug. 15, 1950     J. M. DODWELL     2,518,453
BAND TYPE CLUTCH Filed Nov. 13, 1945     6 Sheets-Sheet 1

FIG. 1

INVENTOR
JOHN. M. DODWELL
BY Fetherstonhaugh & Co.
ATTORNEYS

Aug. 15, 1950 J. M. DODWELL 2,518,453
BAND TYPE CLUTCH
Filed Nov. 13, 1945 6 Sheets-Sheet 3

INVENTOR
JOHN. M. DODWELL
BY Fetherstonhaugh & Co.
ATTORNEYS

Aug. 15, 1950   J. M. DODWELL   2,518,453
BAND TYPE CLUTCH
Filed Nov. 13, 1945   6 Sheets-Sheet 5

INVENTOR.
JOHN. M. DODWELL
BY Fetherstonhaugh & Co.
ATTORNEYS

Aug. 15, 1950   J. M. DODWELL   2,518,453
BAND TYPE CLUTCH

Filed Nov. 13, 1945   6 Sheets-Sheet 6

INVENTOR
JOHN. M. DODWELL
BY Featherstonhaugh & Co.
ATTORNEYS

Patented Aug. 15, 1950

2,518,453

UNITED STATES PATENT OFFICE 2,518,453

BAND TYPE CLUTCH

John M. Dodwell, Shawbridge, Quebec, Canada

Application November 13, 1945, Serial No. 628,013

26 Claims. (Cl. 192—41)

This invention relates to improvements in free-wheeling clutches of the overlapping torque-transmitting band type disclosed in my co-pending prior application Serial No. 541,309, filed June 21, 1944, now U. S. Patent No. 2,422,533 granted June 17, 1947.

The free-wheeling clutch disclosed in said prior application embodies the novel principle of transmitting torque from a driving to a driven clutch member through the agency of torque-transmitting band means affording a plurality of superimposed layers of metal anchored to one of said members and presenting laterally disposed friction surfaces contacting the inclined side walls of a V-groove provided in the other member. When the clutch is at rest the said friction surfaces bear against the side walls of the grooves with a relatively light contact pressure just sufficient to ensure lengthwise tensioning of the superimposed metal layers when the driving clutch member is rotated in a predetermined direction relative to the driven clutch member. This lengthwise tensioning of the superimposed metal layers increases the contact pressure between said friction surfaces and the side walls of the groove sufficiently to cause the driven member to rotate with the driving member. When the driven member tends to overrun the driving member the aforesaid lengthwise tensioning of the superimposed metal layers ceases and the resulting relaxation of said layers reduces the contact pressure between said friction surfaces and the side walls of the groove to permit free-wheeling of the driven member without excessive wearing of said friction surfaces.

As disclosed in said application, the torque-transmitting band means comprises a plurality of separate, superimposed, metal bands, each having one end anchored to the non-grooved member and being provided at its opposite end with a separately formed friction shoe which is fitted in the V-groove of the grooved member and provides the aforesaid laterally disposed friction surfaces.

One improvement afforded by the present invention consists in simplifying and otherwise improving the clutch assembly by eliminating the aforesaid friction shoes and arranging one or more torque-transmitting bands in the V-groove with integral laterally disposed friction surfaces of the band in direct torque-transmitting engagement with the inclined side walls of the groove.

Another improvement afforded by the present invention consists in providing, in a free-wheeling clutch of the aforesaid overlapping torque-transmitting band type, overload release means for preventing damage due to overloading.

Further improvements afforded by the present invention consist in novel methods of assembling the component parts of the clutch and fastening the torque-transmitting bands to the clutch member to which they are anchored.

Proceeding now to a more detailed description of the invention reference will be had to the accompanying drawings, in which—

The clutch assembly shown in Figs. 1 to 4 inclusive, includes drive shaft 5 which may be the armature shaft of an electric starting motor. This shaft is provided with splines 6 for driving engagement with similar splines 7 provided at one end of sleeve 8. A driving clutch member 9 and a shaft guide ring 10 are fixed to the opposite end of sleeve 8 to rotate therewith.

Figure 1:
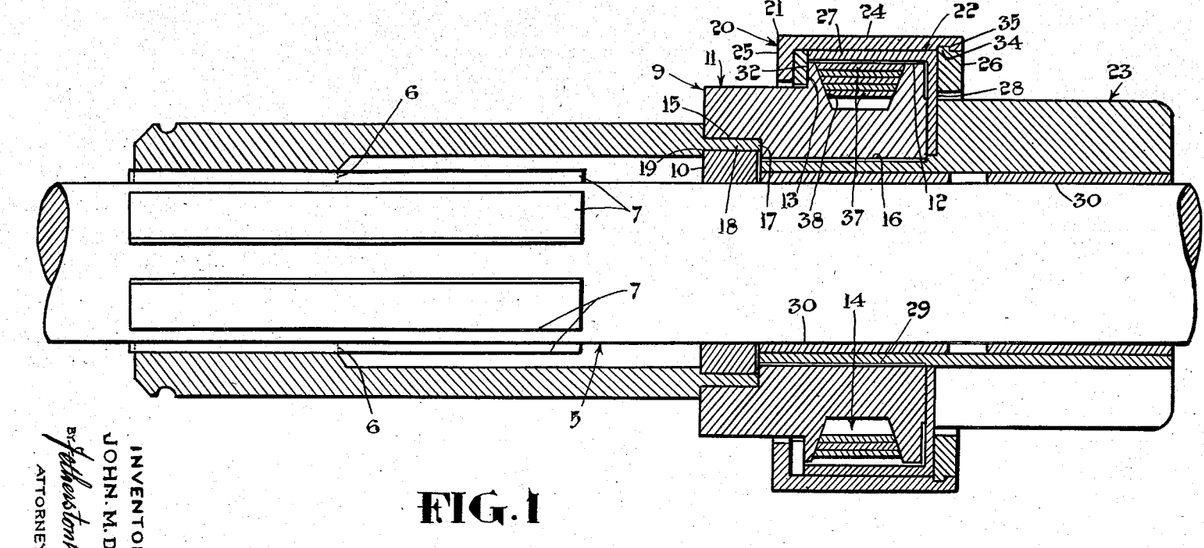
Fig. 1 is a longitudinal sectional view of one form of clutch assembly embodying certain features of my invention.
Figure 2:
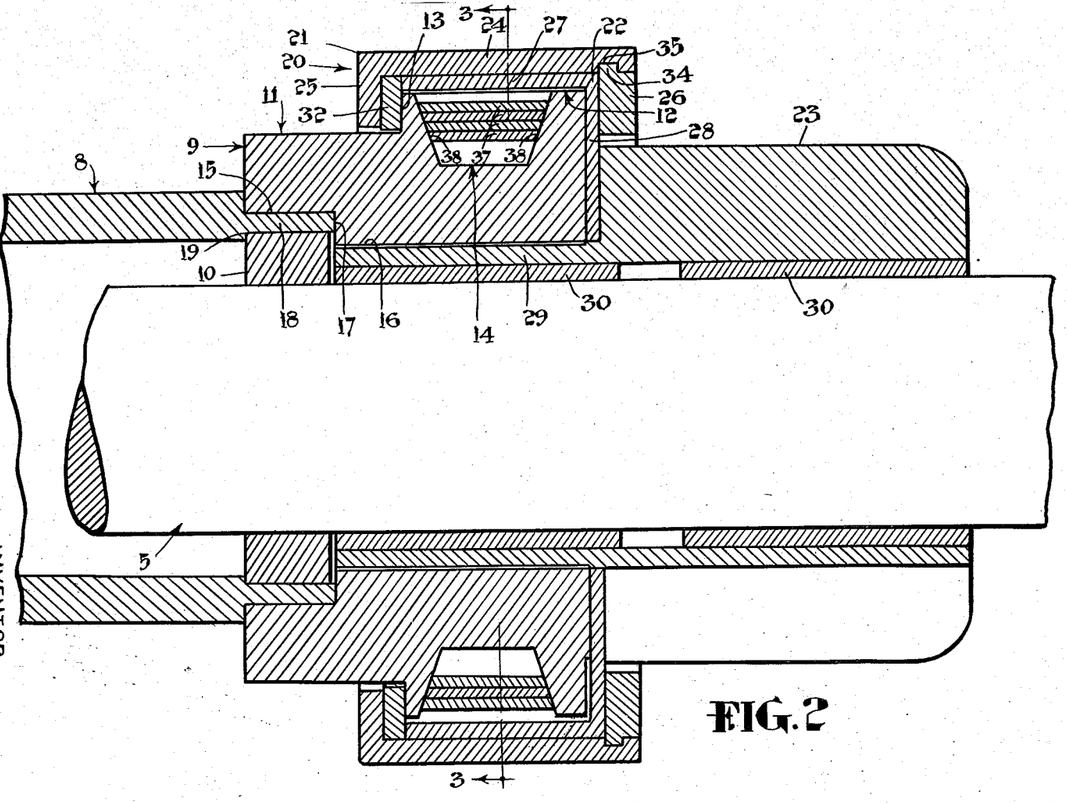
Fig. 2 is an enlarged longitudinal sectional view of a portion of the complete assembly shown in Fig. 1.

Clutch member 9 is formed with outer annular surfaces 11 and 12 of different diameters and with a radial shoulder-forming surface 13 joining said annular surfaces. The larger annular surface 12 is provided with an annular V-groove 14. The bore of clutch member 9 is also formed with annular surfaces 15 and 16 of different diameters to provide a recess 17 in which the reduced end 18 of sleeve 8 is brazed or otherwise secured. The brazed end of sleeve 8 is also formed with an internal annular recess 19 in which shaft guide ring 10 is a press fit.

The driven clutch member assembly is generally indicated at 20. It comprises an outer casing 21 fitted on a shell 22 which is brazed or otherwise rigidly secured to a pinion 23.

Casing 21 comprises peripheral wall 24 and radial side walls 25 and 26. Shell 22 comprises peripheral wall 27 and radial side wall 28. Pinion 23 is formed with hub extension 29 which is rotatably fitted in the bore of clutch member 9 with a small clearance so that it lies opposite and co-extensive with annular surface 16. Pinion 23 and its hub extension 29 are provided with shaft-engaging bushings 30 through which shaft 5 extends.

Figure 4:
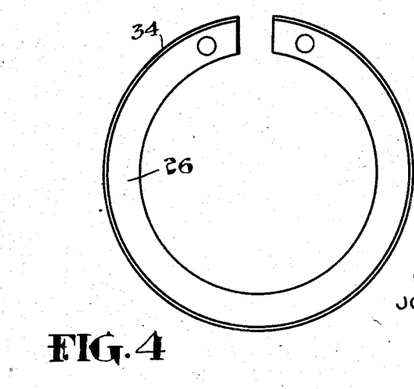
Fig. 4 is a detail view showing the removable radial wall of a casing forming part of the clutch assembly shown in the preceding figures.

Radial wall 25 of casing 21 is opposed to shoulder 13 of clutch member 9 but is separated from said shoulder and from the adjacent free edge of peripheral wall 27 of shell 22 by an interposed thrust washer 32. Radial wall 26 of casing 21 is a removable wall lying outside radial wall 28 of shell 22. Wall 26 preferably comprises a split, resilient, locking ring provided, at its outer periphery, with a locking rib 34 which is fitted in a groove 35 provided in the peripheral wall 24 of casing 21.

The peripheral wall 27 of shell 22 is in force-fitted frictional contact with the peripheral wall 24 of casing 21. The radial wall 28 of shell 22 is interposed between pinion 23 and the pinion side of the clutch member 9 and is brazed or otherwise rigidly secured to the pinion and its hub extension 29.

Figure 3:
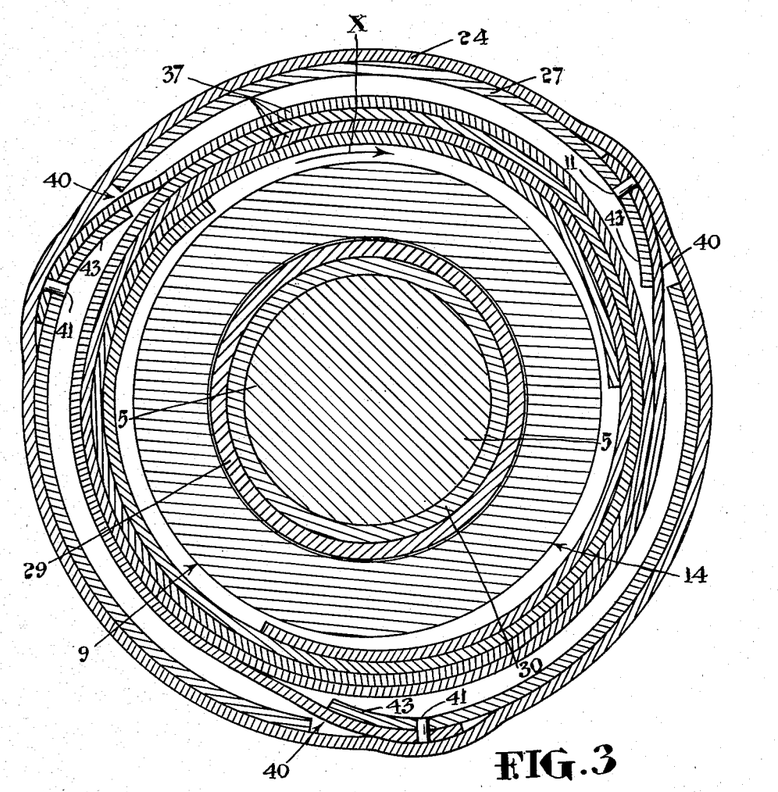
Fig. 3 is a sectional view taken substantially along the section line 3—3 of Fig. 2.

Torque is transmitted from driving member 9 to shell 22 of driven member 20 by a plurality of pre-curved, suitably tapered, torque-transmitting bands 37 arranged in superimposed overlapping relation in groove 14 with their inclined side edges 38 in frictional contact with the inclined side walls of said groove. The bands 37 are overlapped so that the inner and outer ends of each band are staggered circumferentially in relation to the corresponding ends of the remaining bands. The outer end of each band 37 extends tangentially from groove 14 through a slot 40 in the peripheral wall 27 of shell 22 and is anchored to the outer surface of said wall by a short anchoring pin 41 fitted in the band-receiving opening 42. The anchored ends of bands 37 are retained in anchored position against the outer surface of shell wall 27 by the overlying peripheral wall 24 of casing 21. Portions of the shell wall 27 bordering the slots 40 are deflected inwardly as indicated at 43 to provide long curved surfaces over which the bands 37 are tensioned when the driving member is rotating or tends to rotate faster than the driven member. This feature is important in that it eliminates sharp bending of bands 37 adjacent their points of anchorage to the shell wall 27. If desired, the band-anchoring pins 41 may be replaced by anchoring bosses formed integral with the shell wall 27.

The bands 37 are initially precurved so that they are expanded to a slightly larger size by engagement with the walls of groove 14 during placement of the bands in said groove. This results in a slight stressing or tensioning of the bands which ensures sufficient traction between the bands and the side walls of the groove to start the clutch action.

In describing the operation of the clutch assembly shown in Figs. 1 to 4 inclusive, it will be assumed that, in the driving condition of the clutch, the driving shaft 5 and driving clutch member 9 are rotated in the direction indicated by the arrow X in Fig. 3. When driving clutch member 9 rotates relative to driven clutch member 20 in the direction indicated by arrow X it tends to carry with it the engaging torque-transmitting bands 37. This results in tensioning of the bands 37 about the driving clutch member 9 and increases the pressure between the inclined sides 38 of the bands and the engaging inclined sides of groove 14. Driven clutch member 20 is thus caused to rotate with member 9 by the torque transmitted to the peripheral wall 27 of shell 22 through the agency of torque-transmitting bands 37.

When driven member 20 overruns, or tends to overrun, driving clutch member 9 in the direction indicated by arrow X, the tension in the bands 37 and the contact pressure between these bands and the side walls of groove 14 are reduced sufficiently to permit free-wheeling of member 20 with reference to member 9. Any sticking of the bands 37 which tends to resist free-wheeling of member 20 causes the bands 37 to be subjected to longitudinal compression between the two clutch members with the result that the contact pressure between the bands and the side walls of groove 14 is reduced by the positive outward pressure to which the bands are subjected by the compressive stressing thereof.

It is important to the aforesaid tensioning and compression of bands 37 between clutch members 9 and 20 that the portions of the bands which are connected to the shell 22 of member 20 be tangentially disposed with reference to the annular surface 12 of member 9.

The torque capacity of the clutch described herein is substantially increased by the multi-layer arrangement of the bands within groove 14. With this arrangement, the tensioning of each individual band around groove member 9 results in said band exerting increased inward radial pressure on underlying portions of the companion bands so that the pressure with which each individual band is forced against the side walls of the groove by tensioning of said band is augmented by the additional inward radial pressure exerted on said band by the tensioning of the companion bands. This effect, coupled with the wedging action obtaining between the bands and the side walls of the groove, increases the torque capacity of the clutch to an exceptionally high value. Actual tests have shown a torque-capacity of as high as 300 ft. pounds on a grooved member having a diameter of 1½ inches.

It may also be noted that the tensioning of each band 37 around underlying portions of the companion bands is of advantage in that the clutching pressure and wear are uniformly distributed throughout the entire groove-encircling portion of each band. In order to take full advantage of this effect it is desirable that the bands be made as flexible as possible to assist conforming one band on the other and each band to the side walls of the groove.

In the arrangement shown in Figs. 1 to 3 inclusive, the grooved member 9 functions as the driving clutch member and the clutch member 20 functions as the driven clutch member. It is feasible, however, to reverse this arrangement to make member 9 the driven clutch member and member 20 the driving clutch member. For example, the grooved clutch member 9 may be brazed to pinion 23 and the shell 27 of member 20 may be brazed to sleeve 8 in a manner similar to that shown in Fig. 5.

When the clutch is designed so that the grooved clutch member 9 functions as the driven clutch member the weight on the high speed or pinion side of the clutch is reduced to a minimum so that this arrangement is quieter in operation than the arrangement shown in Figs. 1 to 3 inclusive. This is due to the fact that the reduction in weight on the high speed or pinion side of the clutch reduces the tendency of the high speed side of the clutch running out of balance and causing excessive wear on the pinion bushings resulting in making the pinion 23 wobbly and noisy in mesh with the ring gear of the engine when the clutch is operated in the overrunning or free-wheeling condition. On the other hand, where it is possible to make the casing 21 and shell 27 of clutch member 20 sufficiently light, small and well balanced for high speed operation, then the employment of member 9 as the driving clutch member and member 20 as the driven clutch member is highly advantageous for the following reasons.

With grooved clutch member 9 functioning as the driving clutch member the bands 37 can readily be pretensioned so that, when the clutch is at rest or is operating at speeds under maximum starter speeds, the bands will be in clutching or driving contact with the side walls of groove 14 but will be expanded clear of contact with said walls by centrifugal force as soon as the starting of the engine causes pinion 23 and bands 37 to operate at a higher speed within the free-wheeling range. This disengagement of bands 37 with the grooved clutch member 9 during free-wheeling of the clutch saves considerable wear on the bands and the side walls of groove 14. However, should the engine speed drop back to the starter speed before the starter is disengaged, as sometimes happens in cold weather from incorrect choking of the engine, the bands 37 will again contract into contact with the side walls of groove 14 ready to clutch the two members together as soon as the engine speed drops to starter speed.

Figure 5:
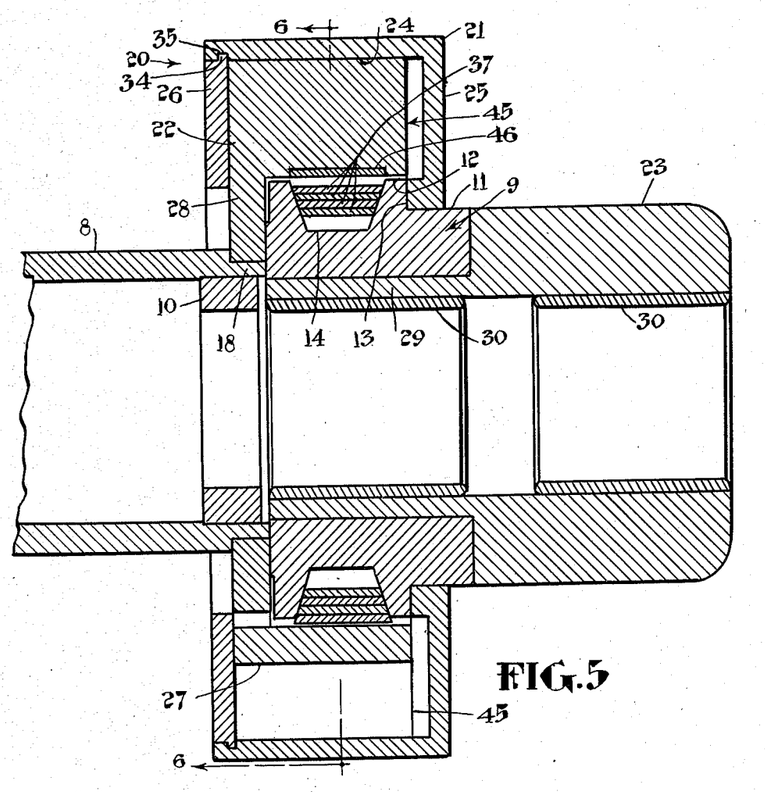
Fig. 5 is a view similar to Fig. 2 but showing a modified clutch assembly.
Figure 6:
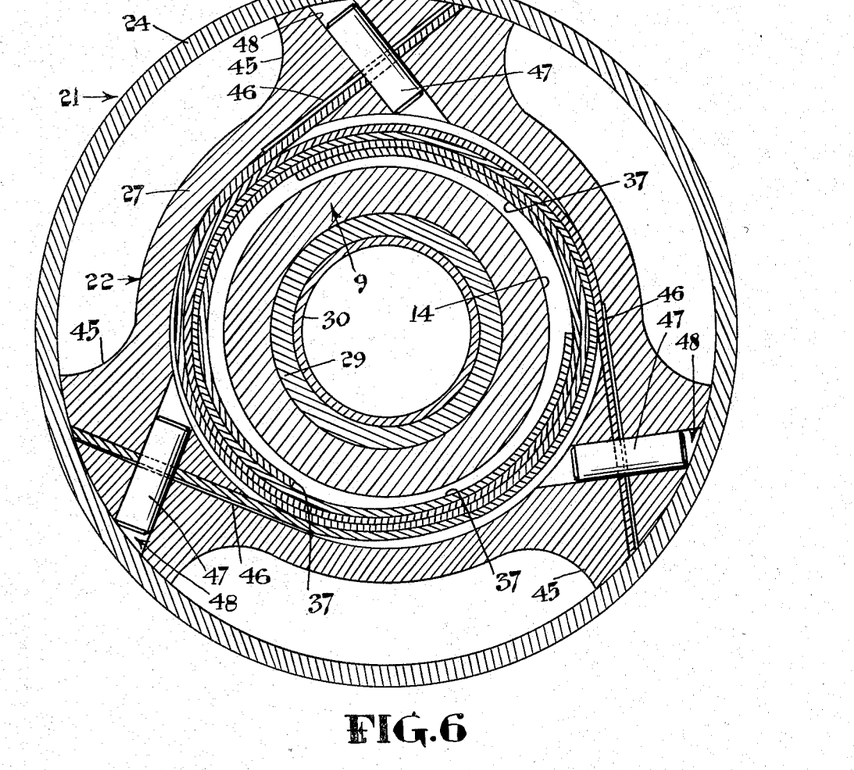
Fig. 6 is a sectional view taken substantially along the line 6—6 of Fig. 5.

Figs. 5 and 6 show a modified clutch assembly in which the grooved clutch member 9 is attached to pinion 23 to serve as the driven clutch member while the clutch member assembly 20 is attached to sleeve 8 to serve as the driving clutch member. In this case clutch member 9 is brazed to pinion 23 and its hub extension 29 so that shoulder 13 lies at the pinion side of groove 14. Shell 22 of clutch member 20 is reversed so that its radial wall 28 lies at the sleeve side of clutch member 9 and is brazed to the reduced end 18 of sleeve 8. Casing 21 of clutch member 20 is arranged with its integral side wall 25 opposed to shoulder 13 and its removable radial wall 26 lying outside radial wall 28 of shell 22.

Figs. 5 and 6 also show a modified method of anchoring the outer ends of torque-transmitting bands 37 to the peripheral wall 27 of shell 22. In this connection it will be noted that portions of the peripheral wall 27 of shell 22 are thickened as indicated at 45 and provided with tangential slots 46 in which the tangentially directed outer ends of bands 37 are anchored by anchoring pins 47 fitted in openings 48 intersecting said slots.

One important advantage of the arrangement shown in Figs. 5 and 6 over that shown in Figs. 1 to 4 inclusive, is that it provides a quieter clutch since the mass of the high speed rotating parts is substantially reduced by attaching the grooved clutch member 9 to pinion 23.

When, as shown in Figs. 5 and 6, the torque-transmitting bands are on what may be termed the sleeve or starter side of the clutch, they must be pretensioned so that, at top starter speed, they are still in contact with the grooved clutch member 9 (regardless of how high a speed is attained by said member 9) in order to be ready to re-clutch if the engine falls back to the starter speed after the engine has once started and the starter is still engaged. In this arrangement the bands must be in constant contact with the grooved clutch member under all conditions of operation and will therefore wear faster than in the case of the arrangement shown in Figs. 1 to 3 inclusive.

Figure 7:
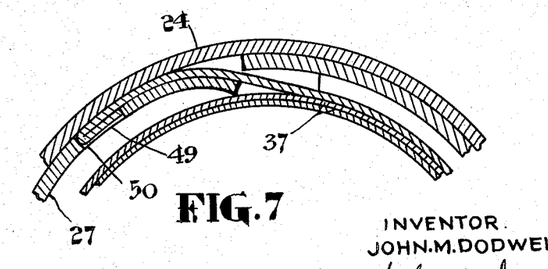
Fig. 7 is a detail sectional view showing a further modification which may be resorted to in fastening the torque-transmitting bands to the clutch member to which they are anchored.

Fig. 7 shows a further modification of the anchorage of torque-transmitting bands 37 to the peripheral wall 27 of shell 22. In this case the method of anchorage is similar to that shown in Fig. 3, except that each band, instead of being anchored by a pin, has its outer end reversely bent and brazed to the body of the band to provide an anchoring key 49 which is fitted in an opening 50 formed in the shell wall 27.

Figure 8:
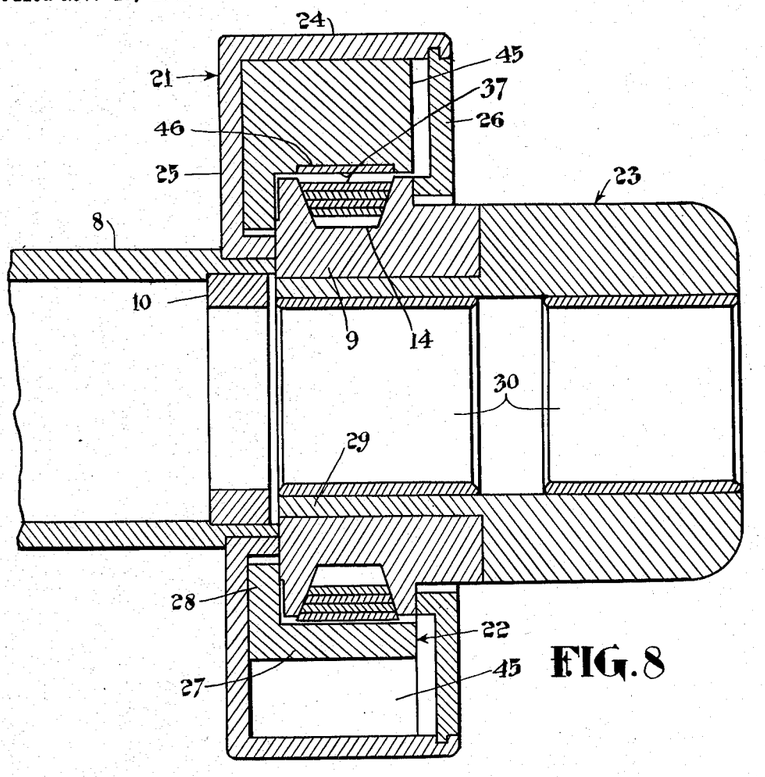
Fig. 8 is a view similar to Figs. 2 and 5 but showing a modified assembly in which means are provided to prevent damage due to overloading.

Fig. 8 shows a further modified clutch assembly in which an overload-release feature is incorporated to prevent damage due to overloading. For example, in the case of a free-wheeling clutch used for coupling together the driving and driven elements of an internal combustion engine starting mechanism it is desirable that overload relieving means be incorporated in the design of the clutch to relieve the destructive overloading force that might otherwise be imposed on the clutch and other elements of the starting mechanism in case of backfire. This requirement is adequately met by the arrangement shown in Fig. 8. In this case the integral radial wall 25 of casing 21 is fastened to and driven by sleeve 8. Shell 22 is free of direct attachment to sleeve 8 and is driven therefrom through the agency of casing 21 in which it is a press fit. The friction obtaining between casing 21 and shell 22 is sufficient to cause these parts to rotate as a unit under ordinary or non-overload conditions of operation. When, as in case of backfire, the torque load on the clutch increases beyond a predetermined safe value, there will be sufficient slippage between casing 21 and shell 22 to prevent damaging of the clutch or other elements of the starting mechanism. If desired, a shim liner may be interposed between the peripheral walls of casing 21 and shell 22 to prevent scoring when these parts are slipping relatively to each other under overload conditions. The torque-transmitting bands 37 shown in Fig. 8 may be anchored to the peripheral wall 27 of shell 22 by any of the previously described anchoring procedures.

Obviously, the overload release feature shown in Fig. 8 can also be incorporated in a clutch assembly in which the clutch member 9 is fastened to and driven by sleeve 8. In such assembly the integral radial wall 26 of casing 21 would be fastened to pinion 23 and the shell 22 would be a press fit in said casing free of direct attachment to said pinion.

Figure 10:
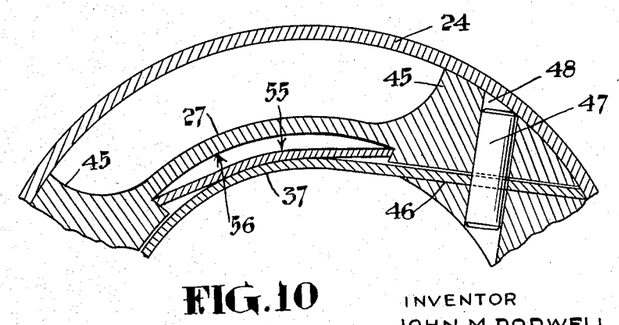
Fig. 10 is a detail sectional view showing a modified arrangement in which booster springs are associated with the torque-transmitting bands.

The effective clutching pressure of each torque-transmitting band 37 may be increased by associating a booster spring 55 therewith as indicated in Fig. 10. As here shown each booster spring 55 is fitted in a groove 56 provided in shell 27 so that the central portion of the spring bears against and exerts inward pressure on the engaging torque-transmitting band 37 adjacent the point where the band leaves the groove 14 and enters tangentially into the slot 46 of shell 27.

Figure 9:
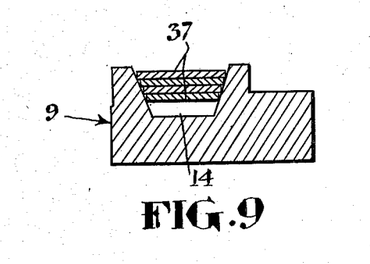
Fig. 9 is a detail sectional view showing a slight modification of the torque-transmitting bands.

In the arrangement shown in Fig. 9, the side edges of the torque-transmitting bands are parallel so that only the inner side corners of the bands contact the side walls of groove 14 when the bands are initially fitted in the grooves. When the clutch is placed in service the parallel side edges of the bands are soon worn down and sloped to conform to the slope of the side walls of the groove in which they are fitted.

The provision of a plurality of torque-transmitting bands 37 is a desirable and important feature of this invention but is not absolutely essential since, in some cases, satisfactory results can be obtained with the use of a single-torque-transmitting band provided the single band is made long enough and is precurved so that it overlaps itself to provide a plurality of superimposed layers of metal contacting the side walls of groove 14. In the case of a single band the tensioning thereof causes each turn to exert inward radial pressure on the underlying turn to cause uniform distribution of pressure throughout the several turns of the band disposed within the groove and to give a high torque capacity.

When a plurality of torque-transmitting bands 37 are used it is not necessary that each band overlap itself within the groove in the manner shown in the drawings. On the contrary, the length of the bands may be such that each band encircles only slightly more than half the circumference of the groove.

As compared with the clutch assembly disclosed in my prior Patent No. 2,422,533 the present invention provides an improved assembly which is simpler in design, consists of fewer parts, is cheaper to manufacture, and gives an improved clutching action. In the patented assembly the friction surfaces contacting the inclined side walls of the V-groove are formed by rigid shoes attached to the torque-transmitting bands which serve mainly as pressure applying bands for increasing the pressure contact between the shoes and the side walls of the grooved clutch member in the engaged condition of the clutch. In the assembly provided by the present invention the rigid shoes are eliminated and the side edges of the bands themselves provide the inclined laterally disposed friction surfaces which contact the side walls of the V-groove in the grooved clutch member. Besides reducing the number of parts and simplifying the design of the clutch assembly, the elimination of the rigid shoes greatly reduces the cost of manufacture. In addition to this the present invention also provides an improved assembly in which the torque is transmitted from the driving to the driven member solely through the bands themselves and the latter, because of their greater flexibility, give a better clutching action than was obtained with the patented arrangement in which the bands were employed mainly to force the rigid shoes into engagement with the side walls of the groove. Another advantage of transmitting the torque through the flexible bands is that the latter are more conformable to give better contact with the side walls of the groove and also provide a clutch in which the wear on the torque-transmitting means is more uniform. In this connection it will be noted that, according to the present invention, the side edges of the bands are in continuous contact with the side walls of the groove so that the bands wear evenly and, by contraction around the grooved member, also ensure an adequate length of contact and uniform wearing characteristics.

Having thus described the nature of my invention and several preferred embodiments thereof, it will be understood that various changes may be resorted to within the scope and spirit of the invention as defined by the appended claims.

I claim:

1. A free-wheeling clutch comprising relatively rotatable clutch members and a plurality of overlapping torque-transmitting bands arranged in a V-groove in one of said members with integral lateral friction surfaces of the bands disposed in direct torque-transmitting frictional contact with the side walls of said groove, said bands being free of attachment to the grooved clutch member and having their outer ends anchored to the other clutch member.

2. A free-wheeling clutch as set forth in claim 1, in which the clutch member to which the bands are anchored comprises two parts, one of which is free of attachment to said bands, said parts being fitted together so that they normally rotate as a unit but are free to rotate relative to each other under conditions of overload.

3. A clutch assembly comprising relatively rotatable shaft and pinion elements and free-wheeling clutch means for transmitting torque from one of said elements to the other, said clutch means comprising a clutch member fastened to the shaft element, a second clutch member fastened to the pinion element and a plurality of overlapping torque-transmitting bands arranged in a V-groove in one of said clutch members and provided with friction surfaces disposed in torque-transmitting frictional engagement with the side walls of said groove, said torque-transmitting bands being free of attachment to the grooved clutch member but being anchored to the other clutch member.

4. A clutch assembly as set forth in claim 3, in which the clutch member to which said bands are anchored comprises two parts including a band anchoring part to which the bands are anchored and a second part free of attachment to said bands, said parts being frictionally fitted together so that they normally rotate as a unit but are free to slip relatively to each other to prevent damage to the clutch when the torque load on the clutch increases beyond a predetermined value.

5. A clutch assembly comprising a drive shaft, a sleeve splined to said shaft and slidable therealong, a pinion rotatable on said shaft, a clutch member fastened to said sleeve, a second clutch member fastened to said pinion, said clutch members being rotatable relatively to each other but being fitted together so that the sleeve, clutch members and pinion are movable as a unit relative to and in the lengthwise direction of the shaft to shift the pinion into and out of engagement with a gear to which power is to be transmitted from said shaft, and a plurality of overlapping torque-transmitting bands arranged in a V-groove in one of said clutch members and provided with friction surfaces disposed in torque-transmitting frictional contact with the side walls of said groove, said torque-transmitting bands being free of attachment to said grooved clutch member but being anchored to the other clutch member.

6. A clutch assembly as set forth in claim 5, in which the clutch member to which the bands are anchored is fastened to said sleeve.

7. A clutch assembly as set forth in claim 5, in which the clutch member to which the bands are anchored is fastened to said pinion.

8. A clutch assembly as set forth in claim 5, in which the clutch member to which the bands are anchored is fastened to said sleeve and comprises two parts including a band-anchoring part which is free of direct attachment to said sleeve but to which the bands are anchored and a second part which is fastened to said sleeve but is free of direct attachment to said bands, said parts being frictionally fitted together so that they normally rotate as a unit but are free to slip relatively to each other to prevent damage to the clutch when the torque load on the clutch increases beyond a predetermined value.

9. A clutch assembly as set forth in claim 5, in which the clutch member to which the bands are anchored is fastened to the pinion and comprises two parts including a band-anchoring part which is free of direct attachment to said sleeve but to which the bands are anchored and a second part which is fastened to said sleeve but is free of direct attachment to said bands, said parts being frictionally fitted together so that they normally rotate as a unit but are free to slip relatively to each other to prevent damage to the clutch when the torque load on the clutch increases beyond a predetermined value.

10. A free-wheeling clutch comprising relatively rotatable clutch members and a plurality of overlapping torque-transmitting bands arranged in a V-groove in one of said clutch members and provided with friction surfaces disposed in torque-transmitting frictional engagement with the side walls of said groove, said bands being free of attachment to the grooved member and having their outer ends extending tangentially from said groove into slots in the other clutch member, and means anchoring the outer ends of the bands to the last mentioned clutch member.

11. A free-wheeling clutch as set forth in claim 10, in which the said means for anchoring the bands to the last mentioned clutch member comprises pins passing through openings in said bands and fitted in pin-receiving holes intersecting said slots.

12. A free-wheeling clutch as set forth in claim 10, in which the means anchoring the outer ends of the bands to the last-mentioned clutch member comprises anchoring pins carried by said clutch member and fitted in openings in said band.

13. A free-wheeling clutch as set forth in claim 10, in which the means anchoring the outer ends of the bands to the last mentioned clutch member comprises key-forming projections carried by the bands and fitted in key-receiving openings provided in said clutch member adjacent said slots.

14. A free-wheeling clutch comprising a rotatable clutch member provided with an annular peripheral V-groove, a second rotatable clutch member comprising a shell including a peripheral wall overlying said groove and a housing in which said shell is fitted, and a plurality of overlapping torque-transmitting bands arranged in said groove in torque-transmitting frictional contact with the side walls of said groove, the outer end of each band extending tangentially from the groove into a slot provided in the peripheral wall of said shell, and means anchoring the outer ends of the bands to said shell wall.

15. A free-wheeling clutch comprising a rotatable clutch member provided with an annular peripheral V-groove, a second clutch member comprising a shell including a peripheral wall overlying said groove and a housing in which the shell is fitted, said housing including a peripheral wall covering and in contact with the peripheral wall of the shell, and a plurality of overlapping torque-transmitting bands arranged in said groove in torque-transmitting frictional contact with the side walls of the groove, the outer end of each band extending from the groove into a slot in the peripheral wall of the shell, and band-anchoring pins fitted in pin-receiving holes formed in the peripheral wall of said shell and intersecting said slots, said pins passing through openings in the portions of the bands disposed in said slots.

16. A free-wheeling clutch comprising a rotatable clutch member provided with an annular peripheral V-groove, a second clutch member comprising a shell including a peripheral wall overlying said groove and a housing in which said shell is fitted, said housing including a peripheral wall in contact with the outer surface of the peripheral wall of the shell, a plurality of overlapping torque-transmitting bands arranged in said groove in torque-transmitting frictional contact with the side walls of the groove, the outer end of each band extending from the groove through a slot in the peripheral wall of the shell and being provided with an opening in which is fitted an anchoring element projecting from the outer surface of the shell adjacent said slot.

17. A free-wheeling clutch comprising a rotatable clutch member provided with an annular peripheral V-groove, a second clutch member comprising a shell including a peripheral wall overlying said groove and a housing in which said shell is fitted, said housing including a peripheral wall in contact with the outer surface of the peripheral wall of the shell, a plurality of overlapping torque-transmitting bands arranged in said groove in torque-transmitting frictional contact with the side walls of the groove, the outer end of each band extending from the groove through and beyond a slot provided in the peripheral wall of the shell, that portion of the band which extends beyond the slot being held against the outer surface of the peripheral wall of the shell by the overlying peripheral wall of the housing and being provided with a key-forming projection fitted in an opening provided in the peripheral wall of the shell adjacent said slot.

18. A free-wheeling clutch assembly comprising a rotatable clutch member provided with an annular peripheral V-groove, a second rotatable clutch member including a shell presenting a peripheral wall overlying said groove and a housing in which the shell is fitted, said housing presenting a peripheral wall overlying the peripheral wall of the shell, a plurality of overlapping torque-transmitting bands arranged in said groove in torque-transmitting frictional engagement with the side walls of the groove, the outer end of each band extending tangentially from the groove and passing through and beyond a slot in the peripheral wall of the shell, the portion of the band extending beyond said slot being confined between opposing portions of the peripheral walls of the shell and housing at one side of said slot and being anchored to the said peripheral wall of the shell, portions of the peripheral wall of the shell bordering said slots being deflected inwardly to provide long curved band-supporting surfaces over which the bands are tensioned in the driving condition of the clutch.

19. In a clutch of the kind described, driving and driven members, one of said members having a circumferential groove with outwardly diverging side walls and torque-transmitting band means connected with the other member and affording a plurality of superimposed layers disposed in said groove so that, when the clutch is at rest, the sides of all of said layers bear against the side walls of the groove with a relatively light contact pressure sufficient to ensure lengthwise tensioning of said layers when the driving member is rotated in a predetermined direction relative to the driven member, said lengthwise tensioning of said layers serving to increase the pressure thereof against the side walls of the groove sufficiently to cause the driven member to rotate with the driving member in said predetermined direction.

20. In a clutch of the kind described, driving and driven members, one of said members having a circumferential groove with outwardly diverging side walls and a torque-transmitting band having one end connected to the other member and having a coiled portion thereof arranged in said groove to provide a plurality of relatively thin superimposed layers contacting the side walls of the groove so that a lengthwise tension is exerted on said layers by rotation of the driving clutch member in a predetermined direction relative to the driven clutch member to thereby increase the pressure of said layers against the side walls of the groove sufficiently to cause the driven member to rotate with the driving member in said predetermined direction.

21. In a clutch of the kind described, driving and driven members, one of said members having a circumferential groove with outwardly diverging side walls and a tapered torque-transmitting band having one end anchored to the other member and having a coiled portion thereof arranged in said groove to provide a plurality of superimposed layers which, when the clutch is at rest, bear against the side walls of the groove with a relatively light contact pressure sufficient to ensure lengthwise tensioning of the band when the driving clutch member is rotated in a predetermined direction relative to the driven clutch member, said lengthwise tensioning of said band serving to increase the pressure of said layers against the side walls of the groove sufficiently to cause the driven member to rotate with the driving member in said predetermined direction.

22. In a clutch of the kind described, driving and driven members, one of said members having a circumferential groove with outwardly diverging side walls and a plurality of superimposed torque-transmitting bands arranged in said groove so that each band extends around more than half the circumference of the groove in contact with the side walls thereof and means connecting each of said bands to the other member, the arrangement being such that, when the clutch is at rest, the sides of all of said bands bear against the side walls of the groove with a relatively light contact pressure sufficient to ensure lengthwise tensioning of said bands when the driving member is rotated in a predetermined direction relative to the driven member, said lengthwise tensioning of said band serving to increase the pressure thereof against the side walls of the groove sufficiently to cause the driven member to rotate with the driving member in said predetermined direction.

23. A clutch as set forth in claim 19, including booster springs arranged to exert inward radial pressure on said layers at predetermined points around said groove.

24. A clutch as set forth in claim 19, in which said layers present sloping side edges contacting the diverging side walls of the groove.

25. A clutch as set forth in claim 19, in which said layers present parallel side edges, the inner corner portions of which contact the side walls of the groove.

26. In a clutch of the kind described, driving and driven members, one of said members having a circumferential groove with outwardly diverging side walls and a single, tapered, torque-transmitting band having one end anchored to the other member and having a coiled portion thereof arranged in said groove to provide a plurality of superimposed layers contacting each other and having their side edges normally bearing against the side walls of the groove with a relatively light contact pressure sufficient to ensure lengthwise tensioning of the band when the driving member is rotated in a predetermined direction relative to the driven clutch member, said lengthwise tensioning of said band serving to increase the pressure of said layers against each other and against the side walls of the groove.

JOHN M. DODWELL.

REFERENCES CITED

The following references are of record in the file of this patent:

UNITED STATES PATENTS

| Number | Name | Date |
|---|---|---|
| 613,766 | Hodgkinson | Nov. 8, 1898 |
| 863,639 | Powell | Aug. 20, 1907 |
| 1,436,830 | Sumner | Nov. 28, 1922 |
| 2,422,533 | Dodwell | June 17, 1947 |